(12) United States Patent
Bonin

(10) Patent No.: US 12,104,890 B2
(45) Date of Patent: Oct. 1, 2024

(54) SYSTEM, DEVICE AND METHOD FOR MEASURING THE INTERIOR REFRACTORY LINING OF A VESSEL

(71) Applicant: PROCESS METRIX, LLC, Pleasanton, CA (US)

(72) Inventor: Michel P. Bonin, Danville, CA (US)

(73) Assignee: Process Metrix, LLC, Danville, CA (US)

( * ) Notice: Subject to any disclaimer, the term of this patent is extended or adjusted under 35 U.S.C. 154(b) by 273 days.

(21) Appl. No.: 17/616,298

(22) PCT Filed: Jun. 4, 2020

(86) PCT No.: PCT/US2020/036038
§ 371 (c)(1),
(2) Date: Dec. 3, 2021

(87) PCT Pub. No.: WO2020/256946
PCT Pub. Date: Dec. 24, 2020

(65) Prior Publication Data
US 2022/0373320 A1     Nov. 24, 2022

Related U.S. Application Data

(60) Provisional application No. 62/862,899, filed on Jun. 18, 2019.

(51) Int. Cl.
*G01B 11/06* (2006.01)
*G01N 21/954* (2006.01)
*G01S 7/481* (2006.01)

(52) U.S. Cl.
CPC ....... *G01B 11/0625* (2013.01); *G01N 21/954* (2013.01); *G01S 7/4817* (2013.01)

(58) Field of Classification Search
CPC .. G01N 21/954; G01N 21/8806; G01N 25/72; G01N 21/90; G01N 29/14;
(Continued)

(56) References Cited

U.S. PATENT DOCUMENTS 4,107,244 A * 8/1978 Ochiai ............... G05D 5/03
73/623
7,230,724 B2 6/2007 Jokinen et al.
(Continued)

FOREIGN PATENT DOCUMENTS

CN   104081152 A   10/2014
CN   107076676 A    8/2017
(Continued)

OTHER PUBLICATIONS

Supplementary European Search Report for EP20825482.1, dated Jul. 18, 2022.
(Continued)

*Primary Examiner* — Michael P Stafira
(74) *Attorney, Agent, or Firm* — MaxGoLaw PLLC

(57) ABSTRACT

A scanner assembly is provided that is configured to be mounted on a scanner manipulator arm, to be placed in proximity to an opening in a vessel or inserted into an opening in a vessel, and to measure distances from a scanner emitter/sensor within the scanner assembly to a plurality of points on the surface of a refractory lining of the vessel to characterize a concave interior of the vessel in a single scan. A scanner manipulator having the manipulator arm attached to the scanner assembly maintains the scanner assembly in measurement positions. A control system controls the position of the scanner assembly, the orientation of the emitter sensor, and the acquisition, storage, processing and presen-
(Continued)

tation of measurements produced by the emitter/sensor. The field of view obtained from the scanner assembly in a single scan exceeds a hemisphere.

14 Claims, 9 Drawing Sheets

(58) Field of Classification Search
CPC ........... G01N 29/4427; G01N 21/8851; G01N 2021/8427; G01N 21/41; G01N 22/02; G01N 25/00; G01N 2021/8887; G01N 2021/9542; G01N 2021/9544; G01N 21/09; G01N 21/658; G01N 21/6428; G01N 21/9072; G01N 2201/06113; G01N 33/54346; G01N 2021/0346; G01N 21/05; G01N 21/9081; G01N 15/082; G01N 23/04; G01N 2021/6439; G01N 33/0057; G01N 33/54366; G01N 21/65; G01N 35/0098; G01N 21/0332; G01N 2201/1087; G01N 2333/938; G01N 21/359; G01N 21/9045; G01N 2201/0635; G01N 23/046; G01N 21/645; G01N 2021/399; G01N 21/01; G01N 21/03; G01N 21/3577; G01N 21/39; G01N 33/543; G01N 2021/9063; G01N 2035/1025; G01N 21/51; G01N 30/7206; G01N 33/00; G01N 2021/6432; G01N 2021/653; G01N 2035/0455; G01N 21/958; G01N 2291/044; G01N 27/00; G01N 33/54386; G01N 33/581; G01N 2021/6419; G01N 2021/6421; G01N 2021/655; G01N 2021/656; G01N 2035/0439; G01N 2035/0453; G01N 21/82; G01N 23/083; G01N 23/20083; G01N 33/49; G01N 35/00584; G01N 35/00732; G01N 35/1016; G01N 1/44; G01N 2021/6463; G01N 2035/00544; G01N 21/17; G01N 21/1717; G01N 21/3504; G01N 21/718; G01N 21/8422; G01N 2201/0627; G01N 35/04; G01N 9/24; G01N 1/02; G01N 1/08; G01N 1/2202; G01N 1/31; G01N 2001/005; G01N 2001/024; G01N 2015/019; G01N 2021/0375; G01N 2035/00277; G01N 2035/00861; G01N 2035/0446; G01N 21/13; G01N 21/55; G01N 2291/2695; G01N 23/2273; G01N 2333/522; G01N 29/07; G01N 33/54326; G01N 33/6854; G01N 1/2211; G01N 1/2226; G01N 1/24; G01N 1/34; G01N 15/1459; G01N 2001/245; G01N 2015/1486; G01N 2021/6417; G01N 2021/6482; G01N 2021/651; G01N 2030/201; G01N 21/3563; G01N 21/3581; G01N 21/552; G01N 21/63; G01N 21/6458; G01N 23/203; G01N 29/28; G01N 29/46; G01N 30/20; G01N 30/72; G01N 30/8617; G01N 30/8631; G01N 30/8686; G01N 30/88; G01N 33/02; G01N 33/48792; G01N 33/493; G01N 35/028; G01N 2001/2223; G01N 2030/525; G01N 2030/746; G01N 2035/041; G01N 2035/042; G01N 2035/0425; G01N 21/9018; G01N 21/9054; G01N 21/9508; G01N 2201/12; G01N 2291/011; G01N 2291/015; G01N 2291/056; G01N 2291/101; G01N 2291/2675; G01N 27/44721; G01N 29/043; G01N 29/11; G01N 29/225; G01N 29/265; G01N 29/341; G01N 29/4445; G01N 29/4463; G01N 30/02; G01N 30/18; G01N 30/52; G01N 30/6082; G01N 30/7233; G01N 30/74; G01N 30/78; G01N 33/10; G01N 33/54373; G01N 33/587; G01N 35/0099; G01N 15/0211; G01N 15/042; G01N 15/05; G01N 2001/2893; G01N 2021/4797; G01N 2021/7786; G01N 2035/1062; G01N 21/31; G01N 21/4795; G01N 21/783; G01N 21/9027; G01N 21/93; G01N 21/94; G01N 2201/0227; G01N 2201/0826; G01N 2201/0833; G01N 2203/0003; G01N 2203/0019; G01N 2203/0062; G01N 2203/0641; G01N 2203/0658; G01N 2203/0676; G01N 2203/0682; G01N 23/00; G01N 27/622; G01N 27/902; G01N 27/9026; G01N 27/9093; G01N 29/04; G01N 29/12; G01N 29/262; G01N 29/345; G01N 3/06; G01N 3/12; G01N 31/22; G01N 33/0034; G01N 33/08; G01N 33/085; G01N 33/2045; G01N 33/227; G01N 33/4905; G01N 33/5432; G01N 33/54333; G01N 33/582; G01N 33/80; G01N 35/00603; G01N 35/00623; G01N 35/10; G01N 1/04; G01N 1/312; G01N 15/00; G01N 15/02; G01N 15/0205; G01N 15/0227; G01N 15/14; G01N 15/1427; G01N 15/1429; G01N 15/1433; G01N 2001/022; G01N 2001/4027; G01N 2015/0053; G01N 2015/1027; G01N 2015/1029; G01N 2015/144; G01N 2015/1445; G01N 2015/1452; G01N 2015/1472; G01N 2015/1477; G01N 2015/1493; G01N 2015/1497; G01N 2021/1765; G01N 2021/646; G01N 2021/6471; G01N 2021/845; G01N 2021/8848; G01N 2021/9546; G01N 2021/9548; G01N 2035/00346; G01N 2035/00465; G01N 2035/00742; G01N 2035/00752; G01N 2035/00851; G01N 2035/0413; G01N 2035/0415; G01N 2035/0436; G01N 2035/0441; G01N 2035/0465; G01N 2035/0475; G01N 21/255; G01N 21/474; G01N 21/64; G01N 21/6408; G01N 21/643; G01N 21/6445; G01N 21/6452; G01N 21/76; G01N 21/8483; G01N 21/85; G01N 21/88; G01N 21/952; G01N 21/95623; G01N 2223/03; G01N 2223/04; G01N 2223/1016; G01N 2223/3308; G01N 2223/643; G01N 2223/645; G01N 2223/646; G01N 2291/02491; G01N 2291/02827; G01N 2291/02836; G01N 2291/02845; G01N 2291/02854; G01N 2291/02881; G01N 2291/0422; G01N 2291/106; G01N 2291/2638; G01N 2291/267; G01N 2458/40; G01N 27/126; G01N 27/30; G01N 27/416; G01N 27/48; G01N 27/61; G01N 27/92; G01N 29/046; G01N 29/223; G01N 29/4454; G01N 33/15; G01N 33/2888; G01N 33/386; G01N 33/492; G01N 33/497; G01N 33/5002; G01N 33/5097; G01N 33/533; G01N 33/542; G01N 33/553; G01N 33/569; G01N 33/588; G01N 35/00; G01N 35/00722; G01N 35/00871; G01N 35/0092; G01N 35/0095; G01N 35/025; G01N 35/026; G01N 35/08; G01N 37/00; G01N 5/00; G01B 11/24; G01B 11/026; G01B 11/06; G01B 11/0616; G01B 11/30; G01B 11/16; G01B 11/0625; G01B 11/12; G01B 11/303; G01B 9/02092; G01B 21/20; G01B 11/02; G01B 11/2408; G01B 11/2513; G01B 11/005; G01B 21/08; G01B 15/02; G01B 11/14; G01B 11/00; G01B 15/025; G01B 17/06; G01B 21/085; G01B 11/0691; G01B 11/26; G01B 11/27; G01B 11/024; G01B 21/14; G01B 5/10; G01B 5/12; G01B 5/30; G01B 15/04; G01B 11/25; G01B 11/2522; G01B 15/00; G01B 11/0658; G01B 11/2433; G01B 17/02; G01B 21/00; G01B 2210/50

See application file for complete search history.

(56) References Cited

U.S. PATENT DOCUMENTS

| 7,746,449 B2 * | 6/2010 | Ray | G01S 7/4817 |
| | | | 356/5.01 |
| 7,924,438 B2 | 4/2011 | Kleinloh et al. | |
| 8,072,613 B2 | 12/2011 | Schmitz et al. | |
| 8,466,406 B2 * | 6/2013 | Hvass | G01S 5/16 |
| | | | 250/214.1 |
| 8,958,058 B2 | 2/2015 | Bonin et al. | |
| 9,279,773 B2 | 3/2016 | Harvill | |
| 9,921,299 B2 * | 3/2018 | Kalscheur | G01S 7/4814 |
| 2006/0232786 A1 | 10/2006 | Jokinen et al. | |
| 2011/0235052 A1 * | 9/2011 | Schmitz | G01N 21/954 |
| | | | 356/608 |
| 2016/0273907 A1 * | 9/2016 | Bonin | F27D 21/0021 |

FOREIGN PATENT DOCUMENTS

| CN | 107615007 A | | 1/2018 | |
| JP | S54115160 A | | 9/1979 | |
| JP | S59202003 A | | 11/1984 | |
| JP | 660235005 A | | 11/1985 | |
| JP | S60235005 A | | 11/1985 | |
| JP | S62291505 A | | 12/1987 | |
| JP | 2012150103 A | * | 8/2012 | ............ C10B 29/06 |
| JP | 2018185253 A | * | 11/2018 | |
| TW | 200704911 A | | 2/2007 | |
| TW | 200728754 A | | 8/2007 | |
| TW | 201606291 A | | 2/2016 | |
| WO | 2003081157 A1 | | 10/2003 | |
| WO | 2018109510 A2 | | 9/2008 | |
| WO | WO-2016153643 A1 | * | 9/2016 | ......... F27D 21/0021 |

OTHER PUBLICATIONS

The International Search Report for PCT/US2020/036038, dated Dec. 24, 2020.

The IPRP for PCT/US2020/036038, dated Jun. 24, 2021.

Search report issued in corresponding Taiwanese Appln. No. 109118947, dated Oct. 31, 2023.

Translation of Office Action issued in corresponding Japanese Appln. No. 2021-575464, dated Mar. 5, 2024.

* cited by examiner

SYSTEM, DEVICE AND METHOD FOR MEASURING THE INTERIOR REFRACTORY LINING OF A VESSEL

CROSS-REFERENCE TO RELATED APPLICATIONS

This application is the National Stage application of International Application No. PCT/US2020/036038, filed Jun. 4, 2020, which claims the benefit of U.S. Provisional Patent Application No. 62/862,899, filed Jun. 18, 2019.

BACKGROUND OF THE INVENTION

(1) Field of the Invention

Embodiments of the subject matter disclosed herein relate generally to apparatuses, methods and systems and, more particularly, to devices, processes, mechanisms and techniques for the characterization of refractory lining of metallurgical vessels.

(2) Description of the Related Art

Receptacles such as a ladle contain a refractory lining acting as a protection against high temperatures when the receptacle contains molten metal. However, the refractory lining is subject to wear or deposits coming from the molten metal. Controlling the refractory lining plays an important role in achieving continuous and safe operation of the receptacle. Performing a visual check of the receptacle, when empty, has been the most common way to monitor the progress of wear and deterioration of a refractory lining. For reasons of time and cost, the measurement method should not require the vessel to be cooled; instead it should be possible to carry out the measurements in a vessel that is at or near operating temperature. For this reason, mechanical surface contact methods of measurement cannot be used.

Measurement of the interior profile of vessels used in the production of molten metal using high-speed scanning laser range finders is widely used in the metal producing industry. Iron and steel ladles, Basic Oxygen Furnaces (BOFs), Argon-Oxygen Decarburization Vessels (AODs), Electric Arc Furnaces (EAFs), aluminum and copper smelting vessels, foundry furnaces, torpedo cars and bottom blown furnaces (Q-BOP's) are all analyzed using laser scanners to determine the interior refractory profile and calculate remaining lining thickness.

It is known in the art to perform measurements in hot refractory vessels by using a laser scanner having a laser beam emitter, a mirror for deflecting the laser beam, and a laser beam receiver for receiving a laser beam reflected by the surface of the refractory lining. The transit time between emission and reception of the laser beam by the laser scanner can be used to calculate a distance between the refractory lining and the laser scanner in the direction of the emitted laser beam. Altering the direction of the laser beam produces a family of transit times, from which a family of distances and a family of points can be derived. A coordinate transform is applied to shift the data set from the coordinate system of the scanner to that of the vessel, and the measurements can be used to determine lining thickness.

Rotating the mirror around a first rotation axis and the laser scanner itself around a second rotation axis allows scanning the refractory lining in two mutually perpendicular directions, so as to obtain a plurality of points representing the scanned surface. By comparing successive images of the surface, it is possible to determine which parts of the refractory lining have corroded or eroded, or grown due to deposits, as the laser scanner is quite accurate. Typical systems offer lining thickness measurement accuracies of +/−5-6 mm.

However, due to the internal shape of the receptacle, internal geometrical constraints of the receptacle, and the fact that the laser scanner cannot be too close to a receptacle that is at or near operating temperature, the laser scanner may be unable to obtain a full view of the surface of interest.

In order to overcome this issue, the laser scanner may be successively moved to different locations, or the receptacle may be repositioned relative to the scanner so that the scanner can obtain an image at each location. These images are then merged into a global "image". Merging the successive images into the global image requires very accurate knowledge of the position of the laser scanner relative to the receptacle at each measurement location. This adds complexity to the process, reduces the accuracy of the global image that is produced, exposes the equipment to additional heat, and extends the amount of time required to complete the measurement.

WO2018109510 contains a description of a device for measuring wear of a refractory lining of a receptacle intended to contain molten metal. However, the device requires two scanner assemblies to perform its intended function, thus introducing the complications of merging the sets of data produced by each scanner assembly. Additionally, the combined field of view of the two scanner assemblies is constrained by the box in which the scanner assemblies are housed. In terms of a spherical coordinate system the values of phi (the angles around the rotation axes of each of the laser scanner), is constrained to approximately 180 degrees. Additionally, the values of theta (the angles, within a plane, bounded by the limits of the field of view of the mirror within the scanner assembly) do not include the z axis.

U.S. Pat. No. 8,072,613 contains a description of a system and method for measuring the wear of a lining of a vessel such as a torpedo ladle. The interior lining of the container is scanned by a scanner head from a first position in the container which is at an angle relative to the vertical axis of the container. The scanner head is placed in a second position in the container at an angle relative to the vertical axis of the container at an angle relative to the vertical axis of the container and from the second position the scanner head scans the portions of the interior lining of the container which were not scanned during the first position scan. By comparing the scanning measurements of the lining from the first position scan and the second position scan after the container has been loaded and unloaded with an initial reference measurement of the lining the wear of the lining can be measured. The system and method thus require two scans for complete measurement and require moving the scanner assembly into a new position for carrying out the second scan. In terms of a polar coordinate system, the allowed values of theta (the angles, within a plane, bounded by the limits of the field of view of the mirror within the scanner assembly) extend to equal magnitude on either side of a plane orthogonal to the z axis. The projections of the allowed values of theta on the interior of a sphere having the mirror as its center form an equatorial belt on the sphere. The allowed values of theta do not include the z axis.

Therefore, based at least on the above-noted challenges of conventional techniques, it would be desirable to have devices, systems and methods that will reduce the number of scans, and hence the measurement times, needed to obtain measurements of refractory lining thicknesses in metallic vessels configured to carry materials above the melting point of the metal, will result in reduced exposure of the scanner to the interior conditions of the vessel being measured, and will reconfigure the field of view to increase the utility and decrease the complexity of the scanning process.

SUMMARY OF THE INVENTION

One or more of the above-summarized needs or others known in the art are addressed by apparatuses, methods, and processes to characterize the refractory lining in a vessel or container. Disclosed apparatuses include a scanner assembly configured to be mounted on a scanner manipulator arm, to be placed in proximity to an opening in a vessel or inserted into an opening in a vessel to a designated position in the concave interior of the vessel, and to measure distances from a scanner emitter/sensor within the scanner assembly to a plurality of points on the surface of the refractory lining to characterize the interior of the vessel in a single scan. Disclosed apparatuses also include a scanner manipulator having a manipulator arm attached to a scanner assembly, wherein the manipulator arm maintains the scanner assembly in a measurement position, and enables a scanner emitter/sensor within the scanner assembly to assume orientations, from which a scanner emitter/sensor can measure distances to a plurality of points on the surface of the refractory lining to characterize the interior of the vessel in a single scan. Disclosed apparatuses also include a robotic device attached to the scanner manipulator, the robotic device having a control system wherein the control system comprises hardware and software to control the position of the scanner assembly, the orientation of the emitter sensor, and the acquisition, storage, processing and presentation of measurements produced by the emitter sensor; the control system being communicatively connected to the scanner assembly; the control system characterizing the refractory lining by comparing the plurality of distances measured by the laser scanning system to a reference surface of the refractory lining.

Methods and processes for characterizing a refractory lining in a vessel are also within the scope of the subject matter disclosed herein. Such methods include the steps of placing a robotic device in an observation position; controlling the robot by use of a control system comprising hardware and software, said control system being communicatively connected to a scanner assembly; extending the scanner assembly, mounted on a manipulator arm attached to the robotic device, into proximity with a vessel or into the interior of a vessel, positioning the scanner assembly, orienting the scanner emitter/sensor in a plurality of sequential orientations, measuring the distance in each orientation from the scanner emitter/sensor to the interior of the vessel, and deriving a characterization of the refractory lining by comparing the plurality of distances measured by the laser scanning system to a reference surface of the refractory lining.

DETAILED DESCRIPTION OF THE INVENTION

Figure 1:
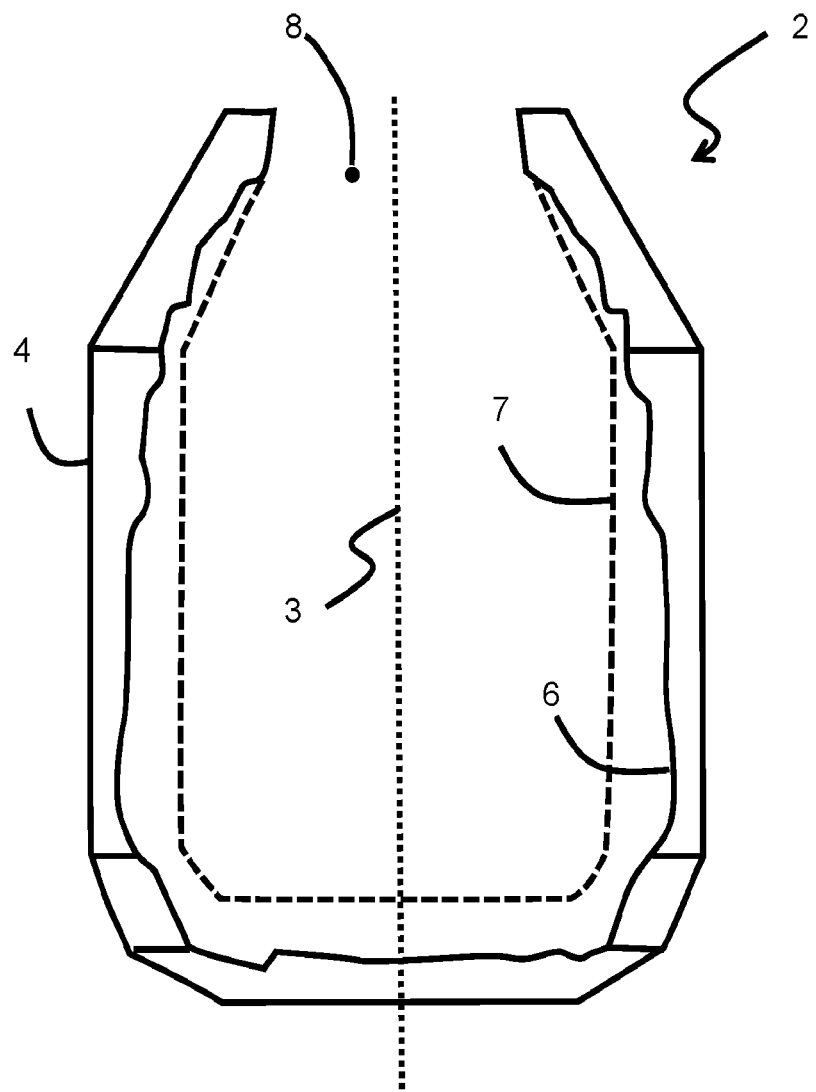
FIG. 1 is a sectional view of a vessel configured to hold materials at elevated temperatures.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of apparatuses, systems, or methods for autonomously scanning refractory lining in metallurgical vessels. However, the embodiments to be discussed next are not limited to these sets, but may be applied to other apparatuses, systems, or methods, including, but not limited to, the characterization of lining materials in vessels configured to carry substances at temperatures above the melting point of the material of which the vessel is constructed. As used herein throughout, the term "characterize," as for example in the expression "characterize the refractory lining," means to analyze and/or measure the inside surface of the refractory lining, using an autonomous laser scanner, in order to determine the interior refractory lining profile and calculate remaining lining thickness in order to, for example, assess the maximum permissible lifetime while maintaining a low probability of breakthrough or determine when repairs are needed. Lining characterization may also be used to determine the position of auxiliary devices used in the metallurgical industry during processing, as for example, the proper set point height above the steel bath for an oxygen lance height.

Reference throughout the specification to "one configuration" or "a configuration" means that a particular feature, structure, or characteristic described in connection with a configuration is included in at least one configuration of the subject matter disclosed. Thus, the appearance of the phrases "in one configuration" or "in a configuration" in various places throughout the specification is not necessarily referring to the same configuration. Further, the particular features, structures, or characteristics may be combined in any suitable manner in one or more configurations.

Reference throughout the specification to "in data communication" means that two elements are connected so that data in electronic or radiation form can be passed from at least one of the elements to the other of the elements. The expression "in command communication" means that a command in electronic or radiation form can be passed from one of the elements to the other of the elements. The expression "in control communication" means that one of the elements is able to control the motion or activity of the other of the elements by instructions by instructions transmitted in electronic or radiation form. The expression "movably connected" means that two elements are connected so that one element can move with respect to the other element, for example, along a common axis, around an axis, or in a hinged manner, while remaining in contact with the other element. The expression "motion in a hinged manner" and the word "hingedly" relate to motion in which one of a pair of elements in communication is constrained to motion around an axis of communication with respect to the other element. The expression "fixedly connected" means that two elements are connected so that they remain in contact and are unable to rotate, to move in a hinged manner, or to move translationally with respect to each other. The expression "exceeds a hemisphere" refers to a shape representing the portion of a sphere, or a portion of a surface of a sphere, described by 360 degrees of longitude and greater than 90 degrees of latitude with respect to a pole, and including the pole. An angle "contains a line" if the line passes through the vertex of the angle, lines in the plane of the angle, and lies between the sides of the angle.

FIG. 1 illustrates a vessel 2 configured to hold materials at elevated temperatures. As used herein throughout, the term "container" or "vessel" is used interchangeably and broadly, including reference to all types of metallic or non-metallic vessels of various sizes and shapes designed to hold materials or gasses (in the case of a gasifier) at elevated temperatures that may be below, at or above the melting point of the vessel material. Examples of such containers or vessels are those used in applications such as, but not limited to, gasification processes in chemical and power production, Electric-Arc Furnaces (EAF), Basic Oxygen Furnaces (BOF), ladles, blast furnaces, degassers, and Argon-Oxygen-Decarburization (AOD) furnaces in steel manufacturing. In addition, as used herein throughout, the term "materials at elevated temperature" is used broadly to mean materials constituted to be disposed inside these vessels having temperatures high enough to cause damage once the same is exposed thereto when the integrity of the refractory materials covering at least a portion of the surface of the vessel is somehow compromised so as to expose the vessel to the materials at the elevated temperatures. As shown, the vessel 2 has a vessel longitudinal axis 3, shell 4, an internal layer of refractory material 6 within shell 4, and an opening 8. Vessel longitudinal axis 3 passes through opening 8. The dashed line 7 in FIG. 1 illustrates the original layer of refractory material 6 before the vessel was placed in use.

Figure 2:
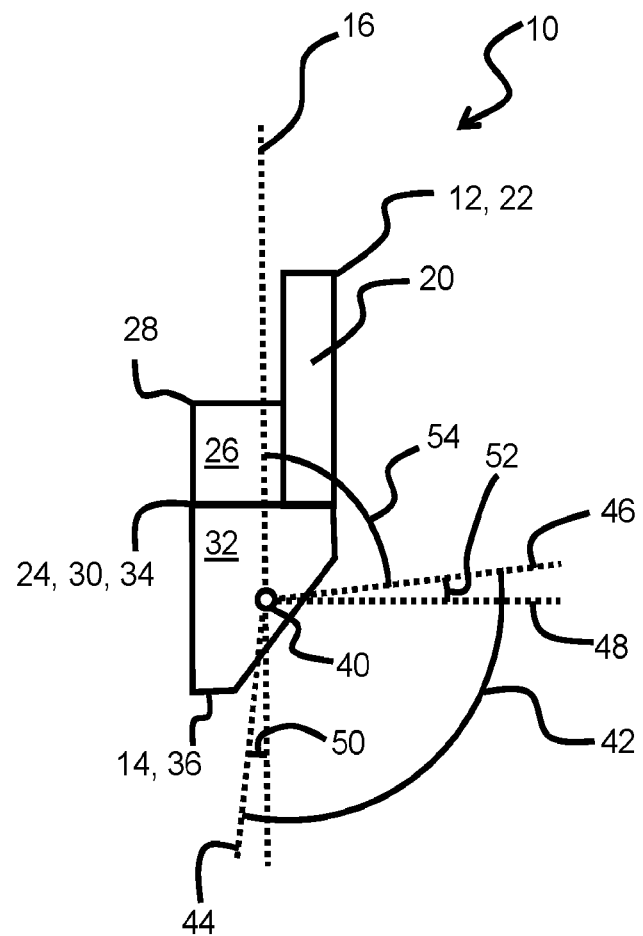
FIG. 2 is a schematic view of a scanner manipulator of the invention.

FIG. 2 illustrates a scanner assembly 10 for measuring wear in a refractory lining. The scanner assembly comprises a scanner assembly proximal end 12, a scanner assembly distal end 14, and a scanner assembly longitudinal axis 16 extending from the proximal end 12 to the distal end 14. A mounting arm 20 having a mounting arm proximal end 22 and a mounting arm distal end 24 is located at the proximal end 12 of the scanner assembly 10. A heat shield 26 having a heat shield proximal end 28 and a heat shield distal end 30 is disposed around at least a portion of the circumference of mounting arm distal end 24. A turret 32 having a turret proximal end 34 and a turret distal end 36 is located at the distal end 14 of scanner assembly 10. The distal end of the mounting arm 20 is rotatably joined to the proximal end of the turret 34. Turret 34 is therefore able to rotate around scanner assembly longitudinal axis 16. The mounting arm 20 and the turret 32 may also be described as in a communication wherein the proximal end 34 of the turret 32 is rotatably mounted on the distal end 24 of the mounting arm 20, in that the turret 32 can rotate relative to the mounting arm 20 about the longitudinal axis. The communication between the mounting arm 20 and the turret 32 may be contained in a plane orthogonal to the longitudinal axis. An emitter/sensor 40 is mounted in a fixed position in the turret 34. The optical center of the emitter/sensor 40 is located on the scanner assembly longitudinal axis 16. The field of view of the emitter/sensor 40 is linear in the longitudinal direction. The field of view of the emitter/sensor 40 may also be described as contained in a plane also containing scanner assembly longitudinal axis 16. In the configuration shown, the plane of the field of view of the emitter/sensor 40 contains the portion of scanner assembly longitudinal axis 16 extending in the distal direction from emitter/sensor 40. The emitter/sensor field of view 42 comprises an emitter/sensor field of view distal limit 44 extending from the distal end of the turret, and comprises an emitter/sensor field of view proximal limit 46 disposed opposite to the distal limit. The field of view of the emitter/sensor 42 is described, in the longitudinal direction, by an obtuse angle containing the extension of the scanner assembly longitudinal axis 16 from the distal end of the scanner assembly, and containing a line 48 in the plane of field of view 42 extending from the emitter/sensor 40 in a plane orthogonal to the longitudinal axis 16.

In selected configurations, the acute angle 50 between distal limit of emitter/sensor field of view 44 and the plane orthogonal to scanner assembly longitudinal axis 16 and passing through emitter/sensor 40 may have a value from and including 1 degree to and including 10 degrees. In selected configurations, the acute angle 52 between proximal limit 46 of emitter/sensor field of view 42 and scanner assembly longitudinal axis 16 may have a value from and including 70 degrees to and including 88 degrees.

Emitter/sensor 40 typically contains a laser, optics, a photodetector, and receiver electronics (not shown). Such emitter/sensor devices are configured to fire rapid pulses of laser light at a target surface, some at up to 500,000 pulses per second. The sensor capability of emitter/sensor 40 measures the amount of time it takes for each pulse to return from the target surface to the scanner through a given field of view. Light moves at a constant and known speed so that information provided by emitter/sensor 40 can be used to calculate the distance between emitter/sensor 40 and the target with high accuracy. By repeating this process in quick succession and by incorporating the orientation of emitter/sensor 40 and the position of the scanner assembly 10 relative to the vessel being measured, the instrument builds up a complex thickness 'map' of the refractory surface it is measuring. By calculating and/or comparing changes between measured refractory thickness maps of the internal surfaces of the refractory lining with a reference measurement of the same surfaces, changes are detected and evaluated for possible conditions that may result in a failure of the refractory lining/shell combination. Single measurements can be made in 20 to 30 seconds.

The emitter/sensor 40 may comprise a laser scanner having a small (about 4 mm) beam diameter, high accuracy (about ±6 mm range error peak-peak) high scanning rates (up to 500,000 Hz), a robust design suitable for the mill environment and the heat loads imposed while scanning high temperature surfaces, eye safe laser wavelength (which eliminates and/or substantially reduces workplace safety concerns), ±55° vertical scan angle, and 0-360° horizontal scan angle. Such laser scanners allow standard resolution scans of a vessel interior in about twenty to thirty seconds, resulting in less vessel down time, and higher production availability. In high resolution mode, the scanner can provide detailed images of the vessel that can be used to characterize the refractory lining, define the region around a tap hole, or the condition of a purge plug.

The field of view of the emitter/sensor in a vertical plane is shown as angle 42. The field of view 42 of the emitter-sensor in a vertical plane, in all rotation positions of turret 32, includes emitter-sensor optical centerline 46 and a line 48 that extends outwardly from emitter/sensor 40 in a horizontal plane that is orthogonal to emitter-sensor optical centerline 46.

Figure 3:
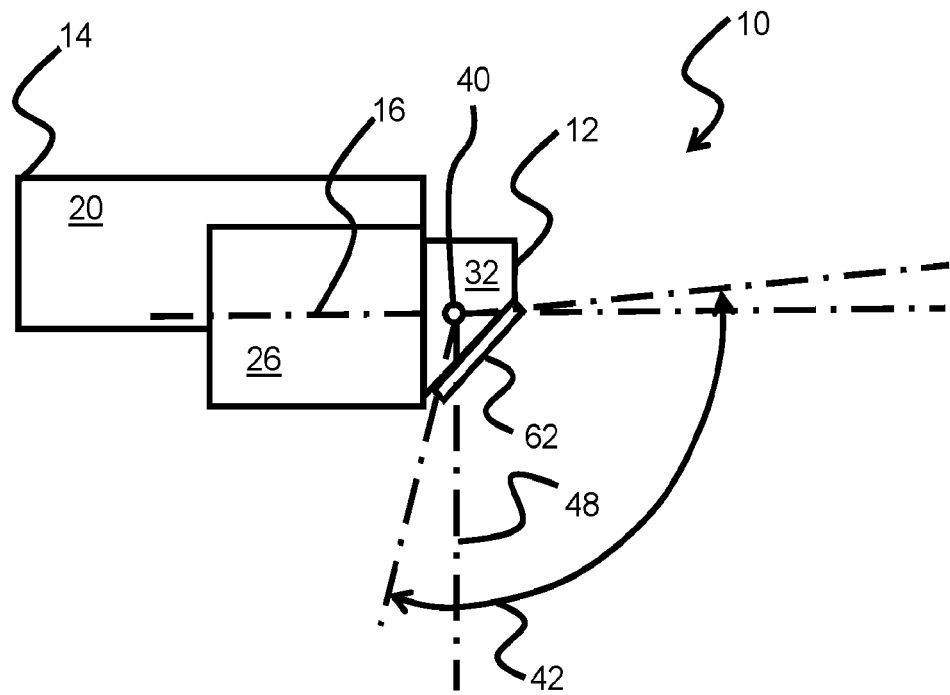
FIG. 3 is a side elevation of a scanner assembly according to the invention.

FIG. 3 is a side view of scanner assembly 10, arranged so that the proximal end 14 and mounting arm 20 are oriented to the left, and so that turret 32, which is attached to mounting arm 20 in a rotatable manner, is shown at right. Distal end of the scanner assembly 12 is oriented to the right. The scanner assembly longitudinal axis 16 is horizontal in this view. The field of view 42 of the emitter-sensor is shown as including scanner assembly longitudinal axis 16, and line 48 which extends outwardly from emitter/sensor 40 in a plane that is orthogonal to scanner assembly longitudinal axis 16. Emitter/sensor 40 is shielded by emitter/sensor window 62. A heat shield 26 is disposed around at least a portion of the circumference of mounting arm distal end 24.

Figure 4:
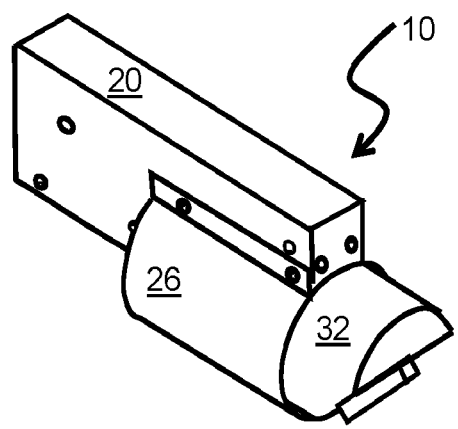
FIG. 4 is a perspective view of a scanner assembly according to the invention.

FIG. 4 is a perspective view of scanner assembly 10. Turret 32 is attached to mounting arm 20 in a rotatable manner. Stationary heat shield 26 is disposed around at least a portion of the circumference of mounting arm 20. Mounting arm 20 is configured to be fixedly attached to a manipulator arm.

The scanner assembly 10 may include an integral cooling system and extensive radiation shielding so as to allow the scanner assembly 10 to be positioned as close as possible (e.g., within a range of about 2 to about 3 m) to high-temperature (1700° C.) surfaces, thereby allowing refractory thickness measurements in high-temperature environments that have limited optical access such as a gasifier.

Figure 5:
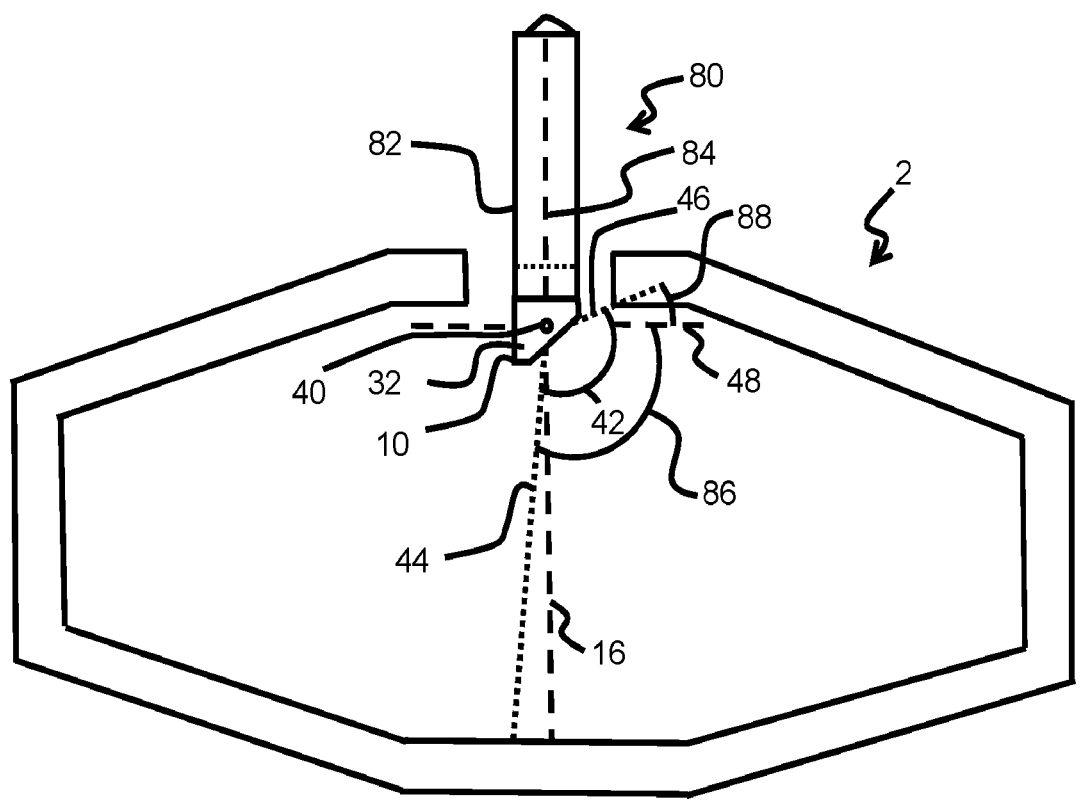
FIG. 5 is a sectional view of a torpedo ladle containing a scanner manipulator according to the invention.

FIG. 5 shows a vertical section of a scanner manipulator 80 in a vessel 2, which is a torpedo ladle in this illustration. Scanner manipulator 80 contains a scanner assembly 10, which contains turret 32 and emitter/sensor 40. The scanner manipulator further comprises an extended form or scanner manipulator arm 82 having a distal end and a proximal end, and a manipulator arm longitudinal axis 84 which may be parallel with or collinear with the longitudinal axis of the scanner assembly 10 and extends from the distal end to the proximal end of the manipulator arm. In the orientation shown, the proximal ends of scanner assembly 10, scanner manipulator 80, and scanner manipulator arm 82 are the upper ends; the distal ends are the lower ends. The distal end of the manipulator arm 82 is fixedly attached to the proximal end of the scanner assembly 10; and the manipulator arm 82 extends longitudinally from the scanner assembly 10. The manipulator arm 82 and the scanner assembly 10 may be attached in an end-on-end manner; one of the manipulator arm 82 and the scanner assembly 10 may contain a receiving portion to accept an insertion portion of the other of the manipulator arm 82 and the scanner assembly 10; or the manipulator arm 82 and the scanner assembly 10 may be joined in overlapping fashion.

Scanner manipulator 80 is positioned so that, upon rotation of turret 32 around scanner assembly longitudinal axis 16, the emitter/sensor is able to view the entire interior of vessel 2.

The field of view of the emitter/sensor in a longitudinal plane is shown as angle 42. Angle 42 is the sum of (a) obtuse distal field of view constituent angle 86 in a vertical plane bounded by (i) line 48 which extends outwardly from emitter/sensor 40 in a plane that is orthogonal to scanner assembly longitudinal axis, and (ii) a line which extends outwardly from emitter/sensor 40 through the distal end of scanner assembly 10 (corresponding here to field of view distal limit 44); and (b) an acute field of view constituent angle 88, coplanar with the distal field of view constituent angle 86, angle 88 being bounded by (i) line 48 which extends outwardly from emitter/sensor 40 in a plane that is orthogonal to scanner assembly longitudinal axis, and (ii) a line which extends outwardly from emitter/sensor 40 on the opposite side of line 48 from angle 86 (corresponding here to field of view proximal limit 46). The field of view 42 of the emitter-sensor is shown as including scanner assembly longitudinal axis 16, and line 48 which extends outwardly from emitter/sensor 40 in a plane that is orthogonal to scanner assembly longitudinal axis, and The field of view 42 of the emitter-sensor in a longitudinal plane, in all rotation positions of turret 32, includes the portion of scanner assembly longitudinal axis 16 that extends in the distal direction from emitter/sensor 40 and the portion of a line 48 that extends outwardly from emitter/sensor 40 in a horizontal plane that is orthogonal to scanner assembly longitudinal axis 16.

Figure 6:
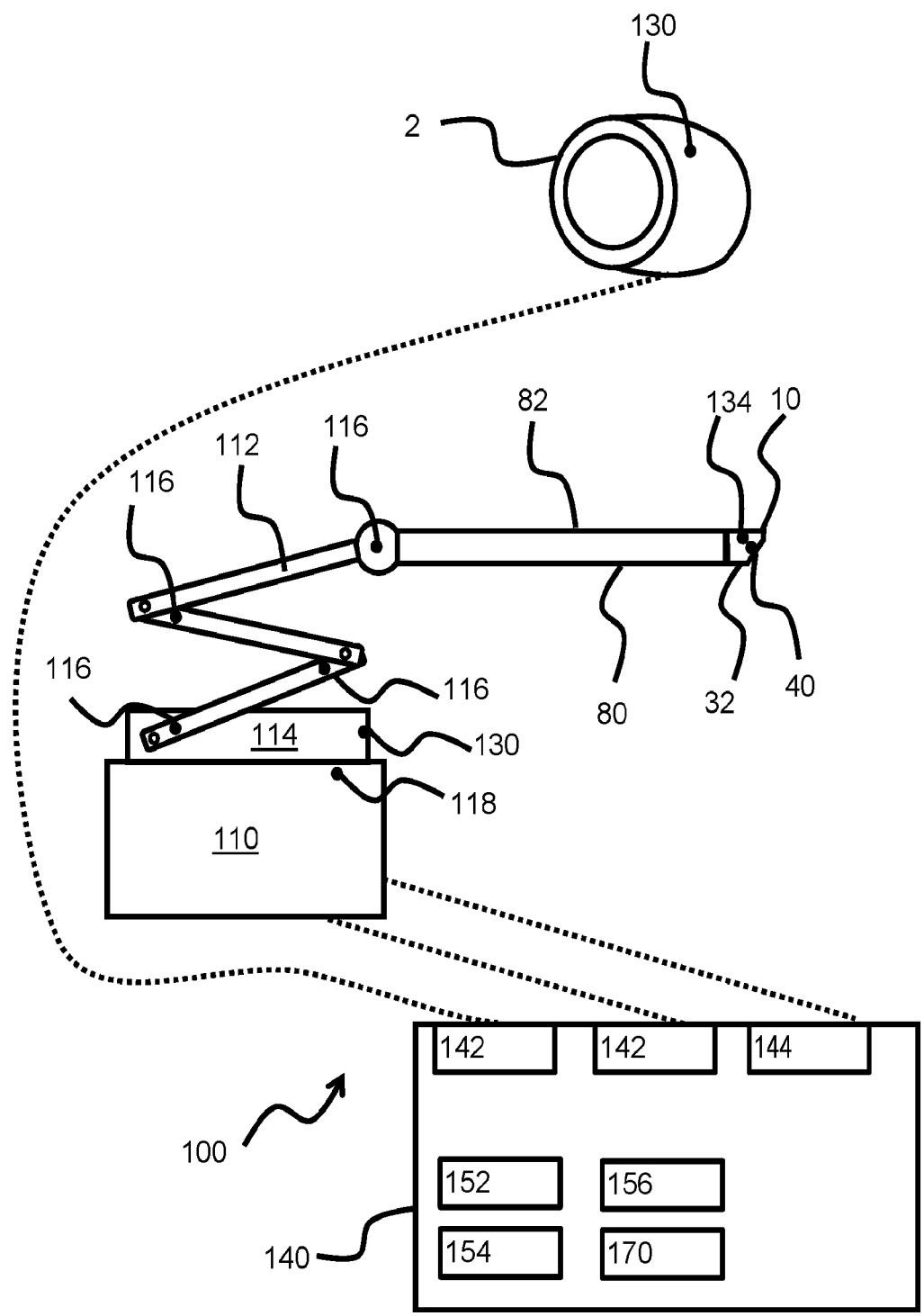
FIG. 6 is a schematic representation of a scanner system according to the invention.

FIG. 6 depicts a scanning system 100 for measuring the interior refractory lining of a vessel 2. The system contains a scanner assembly 10 containing a turret 32 in which an emitter/sensor 40 is housed. The scanner assembly is 10 attached to a manipulator arm 82 to form a scanner manipulator 80. The proximal end of manipulator arm 82 is attached to a support base 110 by a support arm 112 that is configured to move manipulator arm 82 to predetermined positions and orientations. The proximal end of support art 112 may be movably connected to the support base 110. Support platform arm 112 can be translated, rotated and/or moved hingedly with respect to the support base 110. Support arm 112 may be attached to support base 110 by way of support base platform 114, which is movable or rotatable with respect to support base 110. Support arm actuators 116 are disposed on articulated sections of support arm 112 to control the relative positions of connected sections, or to control the orientation of support arm 112 with manipulator arm 82. The proximal end of scanner manipulator 80 may be movably, or hingedly, connected to the distal end of support arm 12. Scanner manipulator 80 may be translated, rotated, or moved in a hinged manner with respect to the support arm 112.

The combination of support base 110, support base platform 114, support arm 112, and manipulator arm 82, or an analogous combination of elements that moves scanner assembly 10, has the simple requirement to move from a rest position to a measurement position, and back to the rest position. The geometry and dimensions of the manipulator should be selected so that scanner assembly 10 can be placed in measurement position for the specific vessel being examined.

Other configurations of the scanning system may make use of different combinations of supports, support arms, joints and rotational devices to move scanner assembly 10 to a measuring position. Support arm 112 and manipulator arm 82 may be combined in an assembly in which support arm 112 and manipulator arm 82 are disposed at right angles, and support arm 112 comprises a pivot which is in communication with a support.

Sensors 130 may be disposed on support base 110, manipulator arm 82, scanner assembly 10 and/or vessel 2 to provide data to determine the position of the vessel with respect to an independent frame of reference, the same frame of reference to which the scanning system is referenced, accounting for up to six degrees of freedom. Sensors 130 disposed on vessel 2 may be single point laser range finders or inclinometers.

An actuator 134, which may be located within the scanner assembly 10, controls the rotary motion of turret 32 with respect to the mounting arm of scanner assembly 10. An actuator 134 controls the angular position of a mirror reflecting light produced by or sensed by emitter/sensor 40; the angle being contained in a plane including the scanner assembly longitudinal axis. An actuator 134 may comprise a microprocessor and may have additional capabilities utilized in the measurement process, including controlling the slow scan motor movement of turret 32 around scanner assembly longitudinal axis 16 (azimuth), controlling the fast scan motor movement setting the angle described between the emitting/sensing direction of emitter/sensor 40 and the scanner assembly longitudinal axis 16 (elevation), laser firing, range data calculation and data buffering, and ultimate transfer of range data to a control device 140.

Control device 140 is in data communication with sensors 130 and emitter/sensor 40 located on the combination of support base 110, manipulator arm 82 and scanner assembly 10. The data communication may be accomplished by physical connection or by wireless transmission. In some configurations control device 140 is linked to, and in data communication with, one or more sensors 130 mounted on vessel 2.

Control device 140 accepts data input from sensors 130 and from emitter/sensor 40 in the combination of support base 110, manipulator arm 82 and scanner assembly 10. In some configurations control device 140 accepts data input from one or sensors 130 mounted on vessel 2. Data are accepted through one or more data input ports 142.

Control device 140 transmits commands to one or more actuators 134 located in scanner assembly 10 to move components with respect to each other in scanner assembly 10, to support arm actuators 116 to move components of support arm 112 with respect to each other, and to support base platform actuator 118 to move support base platform 114 with respect to the rest of support base 110. Actuator commands are transmitted from control device 140 through one or more control output ports 144 to the actuators. Control device 140 is configured to enable, by the transmission of commands to actuators 116, 118 and 134, to address the six degrees of freedom to position scanner assembly 10 in a predetermined location and orientation to accuracy commensurate with the overall measurement uncertainty. The overall accuracy can be determined either by commanding the actuators to move against a mechanical stop, the stop limiting further movement, or to a position determined by measuring the arm position using a combination of linear or angular encoders, as appropriate. Actuators 116, 118 and 134 may comprise servo motors and/or hydraulic actuators.

Control device 140 contains a human/system interface 152 for the entry and display of data, which may include such devices as a keypad, a display screen, a touchscreen, indicators, and control devices and surfaces.

Control device 140 contains a data storage device 154, such as RAM or a hard drive, that stores data produced by sensors 130, emitter/sensor 40, stores data to be used in the performance of calculations, stores command and control programs for the motion of elements of the device such as actuators 116, 118 and 134, and stores calculation programs for the processing of acquired data.

Control device 140 contains a data buffer 156 that temporarily stores data acquired through a data import port 142 until it can be accommodated by data storage device 154.

Control device 140 contains a processor 170 that converts programmed instructions into commands, and processes acquired data. Processor 170 converts position information relating to the location of vessel 2 and relating to the location of emitter/sensor 40 into a common frame of reference.

As depicted cumulatively in FIGS. 1-6, control device 140 issues a command to make a measurement, and an actuator 134 or microprocessor inside scanner assembly 10 controls the measurement process, including the slow scan motor movement of turret 32 around scanner assembly longitudinal axis 16 (azimuth), the fast scan motor movement setting the angle described between the emitting/sensing direction of emitter/sensor 40 and the scanner assembly longitudinal axis 16 (elevation), laser firing, range data calculation and data buffering, and ultimate transfer of range data to control device 140. In an example of a method of operation, the scanner assembly may be oriented at a specified azimuth, and measurements are made over a range of elevation values. The process is repeated over a range of azimuth values.

The emitter/sensor 40 is a remote sensing technology that measures distance by illuminating a target with a laser and measuring the transit time for photons emitted by the laser source to traverse the round-trip distance between the source and the far field reflective surface. A typical 3-D emitter/sensor 40 includes a laser, a scanner, optics, a photodetector, and receiver electronics. Those of ordinary skill in the applicable arts will appreciate, after reviewing the subject matter herein disclosed, that various different types of lasers might be used in emitter/sensor 40, including lasers having different wavelengths as well as different modes of operation (e.g., pulsed or continuous types). Accuracy and resolution of the characterization and measurement of the refractory wear of vessel 2 will depend on how the laser in emitter/sensor 40 is focused by the optics, which will also define the field of view of emitter/sensor 40. Better resolution can be achieved with shorter pulses provided the receiver detector and electronics have sufficient bandwidth to cope with the reduced pulse width. The speed at which images can be developed is affected by the speed at which they can be scanned into the system. A variety of scanning methods are available to scan the beam through the required elevation angles. Accurate mirror positioning affects measurement accuracy.

In addition, the control device 140 of the laser scanning system 100 may include a processor 170 to handle wear characterization and surface temperature measurement. Processor 170 may be incorporated inside of or connected to the laser scanning system 100. A typical laser range finder emitter/sensor 40 incorporates an assembly consisting of a pulsed laser, a method to detect the laser emission event, a multi-faceted mirror, a high-speed detector to detect the light reflected from the far-field surface, and a motor or driver for slowly rotating the aforementioned assembly across the scene of interest. In practice, the laser and detectors work in combination to measure distance, and the mirror/motor direct the laser to create a raster image across the scene. High-resolution encoders are commonly used to determine the angular position of a fast-scan (elevation) rotation (and the slow scan axis as well, with the same resolution).

In one configuration, the laser scanning system 100 comprises an emitter/sensor 40 having a small (about 3.6 mm) beam diameter, high accuracy (6 mm peak-to-peak range error) scanning, large scanning rates (up to about 500,000

Hz), a robust design suitable for the mill environment and the heat loads imposed during scanning high temperature surfaces, an eye safe laser wavelength (which eliminates and/or substantially reduces workplace safety concerns), the capability of being installed in a scanner assembly to produce a +95° to −15° vertical scan angle range and 0° to 360° horizontal scan angle range. Such a laser scanner allows standard resolution scans of a vessel interior in about 6 to 10 seconds, resulting in less vessel down time and higher production availability. In high-resolution mode, the scanner can provide detailed images of the vessel that can be used to detect cracks, define the region around a tap hole, or the condition of a purge plug. Sensors on the instrument measure the amount of time it takes for each laser pulse to leave, travel to the far-field surface and, after reflection, return from the target surface to the scanner. Light moves at a constant and known speed so the emitter/sensor 40 can provide data enabling the calculation of the distance between emitter/sensor 40 and the target with high accuracy. By repeating this in quick succession the instrument builds up a range 'map' of the surface it is measuring. By calculating and/or comparing changes between measured range maps of the refractory material 6 with reference measurement of the same surfaces, changes in refractory thickness or surface topology are detected that may result in failure of the container 2.

Figure 7:
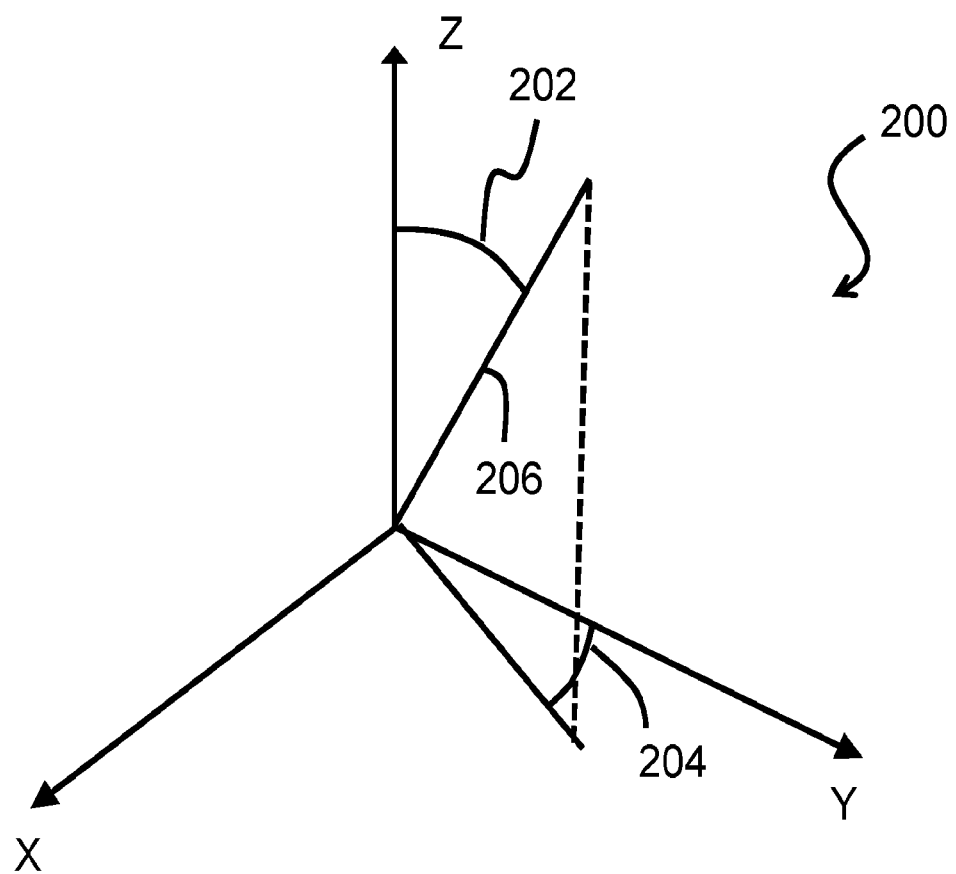
FIG. 7 is a schematic representation of a spherical coordinate system.

FIG. 7 is a schematic representation of a spherical coordinate system 200. Angle 202 is theta (θ), the polar angle measured from fixed zenith direction Z. Angle 204 is phi (φ), the azimuth angle of the orthogonal projection of the polar angle on a reference plane that passes through the origin and is orthogonal to the zenith direction, measured from fixed reference direction Y. Length 206 is r, the radial distance of a point from the fixed origin of the coordinate system.

The field of view of scanner assembly 10 can be described in terms of spherical coordinate system 200. If scanner assembly 10 is aligned so that the distal end 12 of the scanner assembly corresponds to the positive direction of the Z axis and proximal end 145 of the scanner assembly corresponds to the negative direction of the Z axis, and the scanner assembly longitudinal axis 16 is arranged to correspond with the Z axis, the field of view of scanner assembly 10 includes all values of phi from 0 degrees to 360 degrees (i.e., the scanner is free to rotate around the Z axis), and all values of theta from 0 degrees to 90 degrees, thus including the positive extent of the Z axis, and including the XY plane on rotation of the turret around the Z axis. Additional values of theta that may be included in the field of view are −10°, −9°, −8°, −7°, −6°, −5°, −4°, −3°, −2°, −1°, 91°, 92°, 93°, 94°, 95°, 96°, 97°, 98°, 99°, 100°, 101°, 102°, 103°, 104° and 105°. In certain configurations, emitter/sensor field of view distal limit 44 emitter/sensor field of view proximal limit 46 remain constant upon rotation of emitter/sensor 40 around the X axis.

Scanner assembly 10 is designed to possess, with the distal end of the scanner assembly positioned to correspond to the positive direction of the Z axis of a polar coordinate system and with the scanner assembly longitudinal axis aligned with the Z axis of the polar coordinate system, on rotation of the turret through all values of phi in the polar coordinate system from and including 0 degrees to and including 360 degrees, a field of view including, at all values of phi, at least all values of theta in the polar coordinate system from and including 0 degrees to and including 91 degrees.

Alternatively stated, scanner assembly 10 possesses, with the distal end of the scanner assembly positioned to correspond to the positive direction of the Z axis of a polar coordinate system and with the scanner assembly longitudinal axis aligned with the Z axis of the polar coordinate system, on rotation of the turret through all values of phi in the polar coordinate system from and including 0 degrees to and including 360 degrees, a field of view that is symmetric with respect to the Z axis and exceeds a hemisphere. The field of view exceeds a hemisphere in that it comprises a hemispherical portion and also extends from an intersection with the Z axis to a theta value greater than 90 degrees.

The scanner assembly and scanner manipulator disclosed herein are configured so that the depth to which they must be inserted in a vessel having an interior that is entirely concave in longitudinal and latitudinal sections is minimized. If all angles theta, measured from the X axis in a spherical coordinate system having the mouth of the vessel as its YZ plane, are in the range from 90 degrees to 270 degrees for the vessel, the scanner assembly can be placed anywhere outside the vessel on the vessel's longitudinal axis. If the interior of the vessel has theta angles less than 90 degrees or greater than 270 degrees so measured, the scanner assembly must be placed closer to the mouth of the vessel as the theta values decrease from 90 degrees or increase from 270 degrees.

Figure 8:
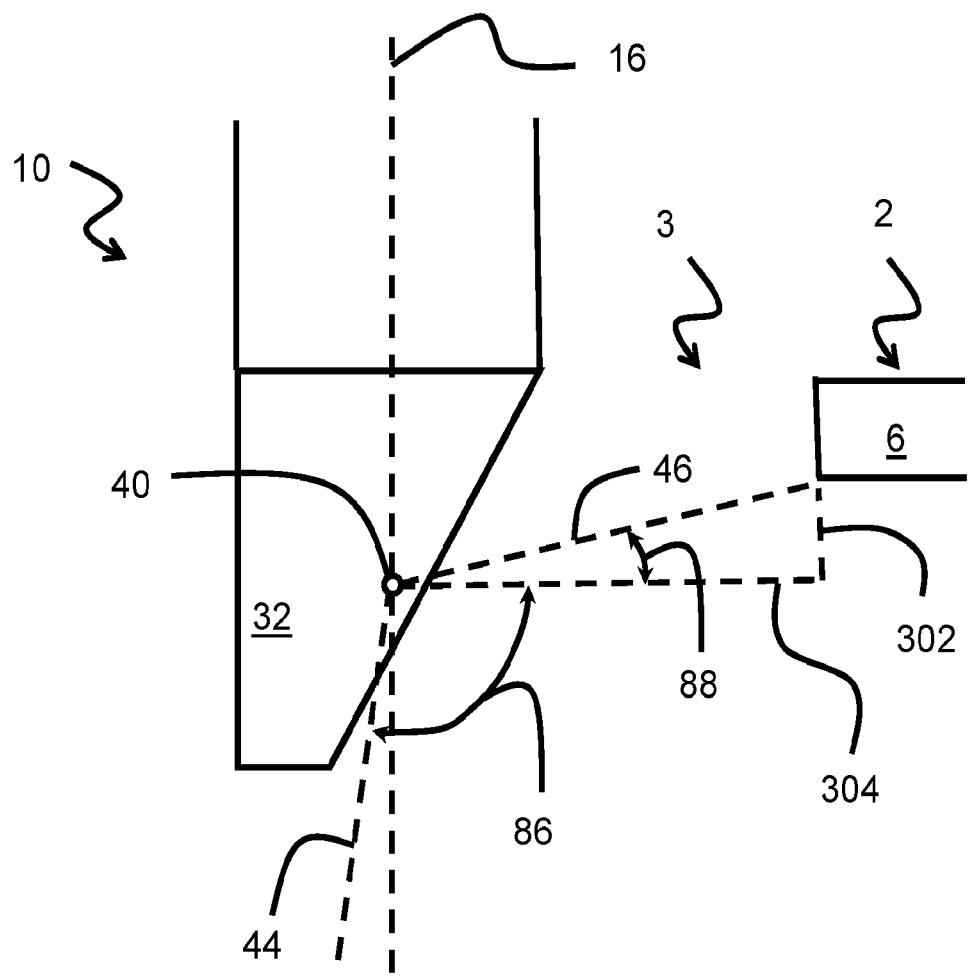
FIG. 8 is a schematic representation of the geometry of placement of a scanner assembly.

If the theta angle values for a vessel approach 0 degrees or 360 degrees, the scanner assembly and scanner manipulator must be inserted into the mouth of the vessel to scan the entire interior. FIG. 8 shows a scanner assembly 10 being used to scan the interior of a vessel 2 having an inner layer of refractory material 6. The portion of inner layer of refractory material 6 in proximity to vessel opening 3 is orthogonal to the longitudinal axis of the vessel and to scanner assembly longitudinal axis 16. Scanner turret 32 contains emitter/sensor 40 having emitter/sensor field of view distal limit 44 and emitter/sensor field of view proximal limit 46. Angle 86 is the distal component of the field of view angle in a plane containing scanner assembly longitudinal axis 16. Angle 88 is the proximal component of the field of view angle in a plane containing scanner assembly longitudinal axis 16. The intersection of angles 86 and 88 is a line contained in a plane orthogonal to scanner assembly longitudinal axis 16.

The required extent of insertion 302 of emitter/sensor 40 into vessel 2 can be determined from angle 88 and from the distance 304 of the emitter/sensor 40, in a plane orthogonal to the scanner assembly longitudinal axis 16, from inner layer 6. In the following formula, angle 88 is represented as alpha, distance 304 is represented as x, and the required extent of insertion 302 is represented as z:

$$z = x(\tan \alpha)$$

These values are obtained for the special case, in a vessel in which having an interior that is entirely concave in longitudinal and latitudinal sections, in which a portion of the inner layer of refractory material 6 in proximity to the vessel opening 3 has a theta angle values essentially equal to 0° or 360°. For vessels having an interior that is entirely concave in longitudinal and latitudinal sections, and in which the theta values are closer to 90° or 270°, the required extent of insertion will be much smaller.

Figure 9:
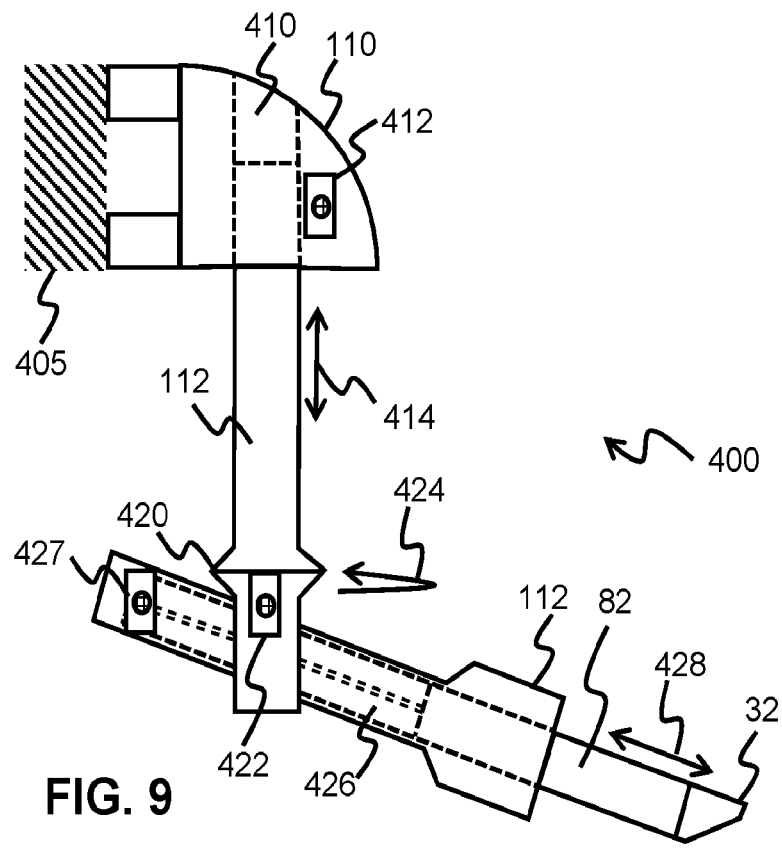
FIG. 9 is a schematic representation of the mechanical portion of a scanner system according to the invention.

FIG. 9 is a schematic representation of the mechanical portion 400 of a scanner system according to the invention. A surface 405 supports a support base 110. A support base channel 410, depicted as vertical in this representation, passes through support base 110. Support base channel accommodates the upper end of a first support arm 112. Linear motion of first support arm 112 in support base channel 410 is effected and produced by actuator 412. Actuator 412 may include a rack and gear mechanism, or any other mechanism capable of producing relative linear motion of first support arm 112 in support base channel 410. Arrow 414 shows the direction of motion of first support arm 112 in support base channel 410.

The lower end of first support arm 112 is attached to the upper end of first support arm 112 through rotatable connection 420. Rotation of the lower end of first support arm 112 with respect to the upper end of first support arm 112 is effected and produced by actuator 422. Actuator 422 may include a stepping motor, or any other mechanism capable of producing precise and accurate rotatory motion. Arrow 424 shows the direction of revolution of the lower end of first support arm 112.

The lower end of first support arm 112 is configured to hold the longitudinal surface of a second support arm 112. As depicted, the second support arm 112 is positioned so that an open end is lower than a closed end. The second support arm 112 may be placed in a horizontal position, or at any angle with the horizontal plane. Second support arm 112 contains a support arm channel 426 that accommodates a scanner manipulator having a manipulator arm 82 and a turret 32. Actuator 427 effects and produces retraction and protrusion of manipulator arm 82 into and out of support arm channel 426. Actuator 427 may include a rack and gear mechanism, or any other mechanism capable of producing relative linear motion. Arrow 428 shows the direction of motion of manipulator arm 82 in support arm channel 426.

Figure 10:
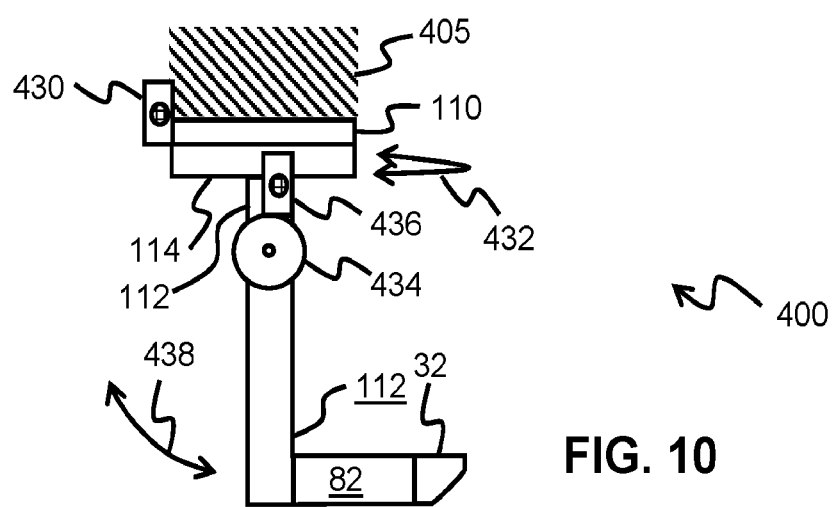
FIG. 10 is a schematic representation of the mechanical portion of a scanner system according to the invention.

FIG. 10 is a schematic representation of the mechanical portion 400 of a scanner system according to the invention. A surface 405 supports a support base 110. Support base 110 is attached to support base platform 114 through rotatable connection 420. Rotation of support base platform 114 with respect to support base 110 is effected and produced by actuator 430. Actuator 430 may include a stepping motor, or any other mechanism capable of producing precise and accurate rotatory motion. Arrow 432 shows the direction of revolution of support base platform 114.

A first support arm 112 extends downwardly from support base platform 114. First support arm 112 is connected to a second support arm 112 by a pivot 434. Actuator 436 effects and produces rotatory motion of second support arm 112 around the axis of pivot 434. Arrow 438 shows the direction of motion of second support arm 112 around pivot 434. Second support arm 112 is joined to the proximal end of manipulator arm 82. The connection of second support arm 112 to the proximal end of manipulator arm 82 is depicted as a right angle; it may take any form expediting the scanning of a vessel; it may be fixed or adjustable. Second support arm 112 and manipulator arm 82 may be formed as a single piece. Second support arm 112 may contain an additional pivot and actuator to provide additional degrees of freedom of motion.

In a variation of the mechanical portion 400 of the depicted scanner system depicted, base platform 114 and actuator 430 are omitted, and second support arm 112 is in direct communication with support base 110.

Figure 11:
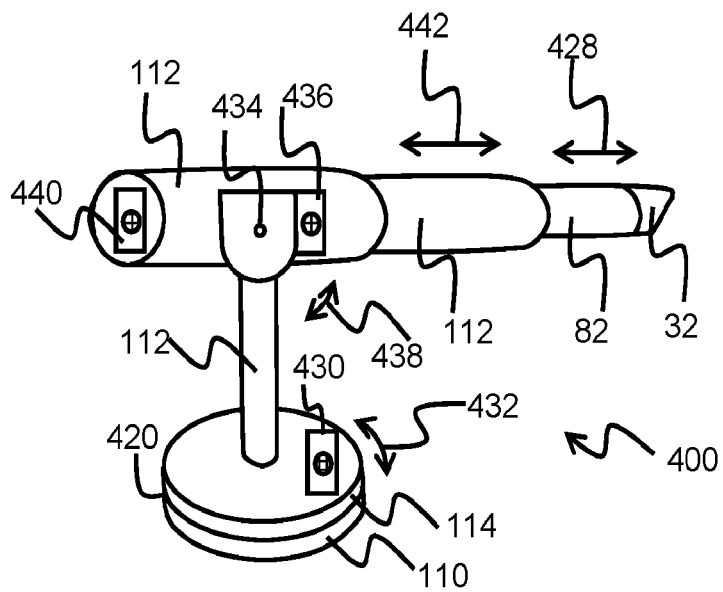
FIG. 11 is a perspective view of the mechanical portion of a scanner system according to the invention.

FIG. 11 is a perspective view of the mechanical portion of a scanner system 400 according to the invention, supported on a support base 110. Support base 110 is attached to support base platform 114 through rotatable connection 420. Rotation of support base platform 114 with respect to support base 110 is effected and produced by actuator 430. Actuator 430 may include a stepping motor, or any other mechanism capable of producing precise and accurate rotatory motion. Arrow 432 shows the direction of revolution of support base platform 114.

A first support arm 112 extends upwardly from support base platform 114. First support arm 112 is connected to a second support arm 112 by a pivot 434. Actuator 436 effects and produces rotatory motion of second support arm 112 around the axis of pivot 434. Arrow 438 shows the direction of motion of second support arm 112 around pivot 434. The rotatory motion of second support arm 112 around the axis of pivot 434 may be controlled by servo motors and/or hydraulic actuation.

Second support arm 112 has an open end and contains an interior support arm channel that accommodates, in a telescoping fashion, a third support arm 112. Third support arm 112 has an open end and contains an interior support arm channel that accommodates, in a telescoping fashion, a scanner manipulator having a manipulator arm 82 and a turret 32. Actuator 440 effects and produces retraction and protrusion of manipulator arm 82 into and out of the support arm channel of third support arm 112, and retraction and protrusion of third support arm 112 into and out of the support arm channel of second support arm 112. Actuator 440 may include a rack and gear mechanism, or any other mechanism capable of producing relative linear motion. Arrow 442 shows the direction of motion of third support arm 112 into and out of the support arm channel of second support arm 112. Arrow 428 shows the direction of motion of manipulator arm 82 into and out of the support arm channel of third support arm 112.

Figure 12:
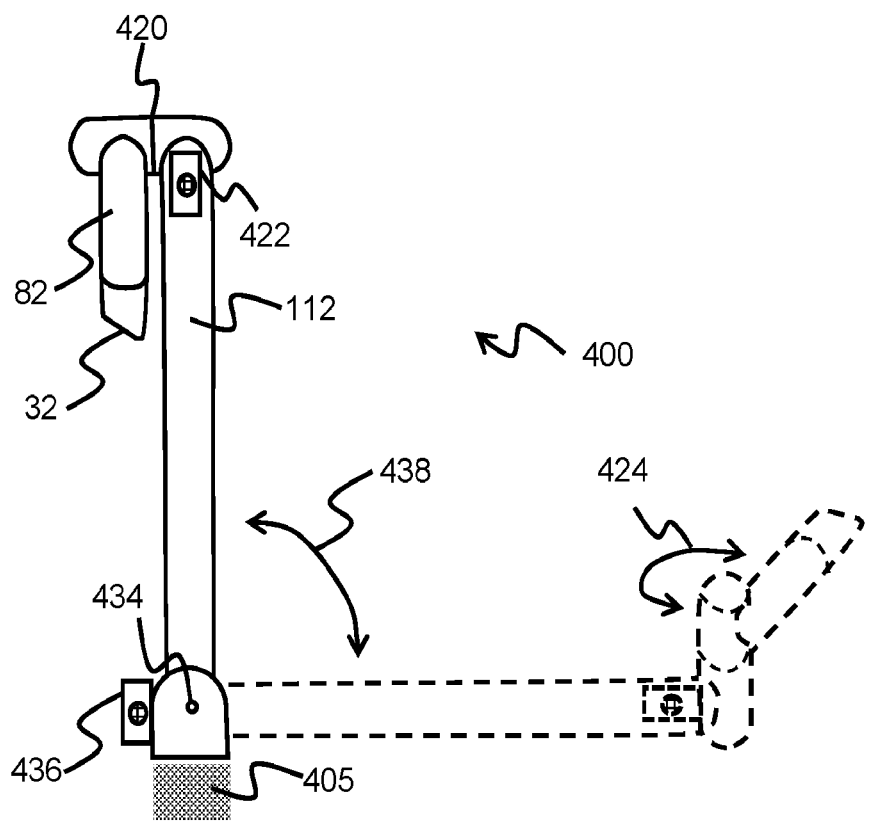
FIG. 12 is a schematic representation of the mechanical portion of a scanner system according to the invention.

FIG. 12 is a schematic representation of the mechanical portion 400 of a scanner system according to the invention. Pivot 434 is supported by or on a surface 405. Actuator 436 enables the rotation of support arm 112 at its proximal end from a vertical position (a storage position, indicated by solid lines) to a horizontal working position, indicated by dashed lines. Arrow 438 shows the direction of motion of support arm 112 between the vertical position and the horizontal position.

Support arm 112 is joined, at its distal end, to the proximal end of a manipulator arm 82 having a turret 32 at its distal end, through a rotatable connection 420. Rotation of rotatable connection 420 takes place around an axis that is orthogonal to the longitudinal axis of support arm 112 and orthogonal to the longitudinal axis of manipulator arm 82, and is effected and produced by actuator 422. Actuator 422 may include a stepping motor, or any other mechanism capable of producing precise and accurate rotatory motion. Arrow 424 shows the direction of revolution of the lower end of first support arm 112 in the horizontal working position of scanner system mechanical portion 400.

The following process is used to perform measurements on a vessel: The vessel is emptied, and extraneous material is removed. The vessel position is then determined, either by dead reckoning (the vessel is placed in the same position each time it is measured) or by the use of external sensors. The vessel is then oriented so that the surface of interest inside the vessel can be contained in the field of view of the scanner assembly attached to the scanner manipulator. The scanner manipulator is placed at a measurement position, ordinarily a position on or close to a longitudinal axis of the vessel passing through the vessel opening. The turret of the scanner manipulator is rotated around the longitudinal axis of the scanner assembly; measurements are made and a profile of the interior of the vessel is produced. The profile of the interior of the vessel is compared with a reference set of data or to a three-dimensional model created of the vessel.

Comparison enables the detection of areas where wear has occurred, or where deposits have occurred.

A method of measuring wear in a refractory lining comprises:
 a) Emptying a vessel containing the lining;
 b) Positioning the vessel;
 c) Orienting the vessel so that the lining surface of interest inside the vessel can be contained in the field of view of a scanner assembly;
 d) Providing a scanner assembly comprising a mounting arm; a turret attached to the mounting arm in a rotatable manner, and an emitter/sensor contained within the turret; wherein the scanner assembly possesses, with the distal end of the scanner assembly positioned to correspond to the positive direction of the Z axis of a polar coordinate system and with the scanner assembly longitudinal axis aligned with the Z axis of the polar coordinate system, on rotation of the turret through all values of phi in the polar coordinate system from and including 0 degrees to and including 360 degrees, a field of view that is symmetric with respect to the Z axis and exceeds a hemisphere.
 e) Placing the scanner assembly at a measurement position;
 f) Activating the emitter/sensor;
 g) Rotating the turret through all values of phi in the polar coordinate system;
 h) Obtaining, for selected values of phi, data for selected values of theta in the polar coordinate system;
 i) Collecting the data provided by the emitter/sensor; and
 j) Generating a profile of the interior of the vessel from the collected data.

A scanner assembly for measuring wear in a refractory lining comprises:
 a distal end, a proximal end, and a longitudinal axis extending from the proximal end to the distal end;
 a mounting arm having a proximal end and a distal end and located at the proximal end of the scanner assembly;
 a turret having a proximal end and a distal end, wherein the distal end of the mounting arm is rotatably joined to the proximal end of the turret, wherein the communication between the mounting arm and the turret is contained in a plane orthogonal to the longitudinal axis; and
 an emitter/sensor mounted in a fixed position in the turret;
 wherein the optical center of the emitter/sensor is located on the longitudinal axis;
 wherein the field of view of the emitter/sensor is linear in the longitudinal direction;
 wherein the field of view comprises a distal limit extending from the distal end of the turret, and comprises a proximal limit disposed opposite to the distal limit;
 and wherein the field of view of the emitter/sensor is described, in the longitudinal direction, by an obtuse angle containing the extension of the longitudinal axis from the distal end of the scanner assembly, and containing a line extending from the emitter/sensor in a plane orthogonal to the longitudinal axis.

The scanner assembly may be configured so that the rotatable joining of the distal end of the mounting arm to the proximal end of the turret enables the turret to rotate 360 degrees around the longitudinal axis of the scanner assembly. The scanner assembly may be configured so that the field of view of the emitter/sensor lies in a plane that includes the longitudinal axis of the emitter/sensor. The scanner assembly may comprise a heat shield that is disposed over at least a portion of the circumference of the distal end of the mounting arm. The scanner assembly may contain a single emitter/sensor; the scanner assembly may exclude a second emitter/sensor; the number of emitter/sensors in the scanner assembly may be exactly one.

The scanner assembly may be configured so that the acute angle described by the distal limit of the field of view and the longitudinal axis has a value from and including 1 degree to and including 10 degrees. The scanner assembly may be configured so that the acute angle described by the proximal limit of the field of view and the longitudinal axis has a value from and including 70 degrees to and including 88 degrees.

The scanner assembly may be configured so that it is not in communication with a refractory application device, or so that it is not part of a device comprising a refractory application device. A refractory application device is a device configured to spray, gun, or otherwise convey a refractory material to a surface so that the material adheres to the surface. The scanner assembly may be configured so that the turret is constrained from rotating about the mounting arm around any axis other than the longitudinal axis of the scanner assembly.

The scanner assembly may be configured so that, with the distal end of the scanner assembly positioned to correspond to the positive direction of the Z axis of a polar coordinate system and with the scanner assembly longitudinal axis aligned with the Z axis of the polar coordinate system, upon rotation of the turret through all values of phi in the polar coordinate system from and including 0 degrees to and including 360 degrees, the scanner assembly possesses a field of view including at all values of phi, all values of theta in the polar coordinate system from and including 0 degrees to and including 91 degrees.

The scanner assembly may be configured so that, with the distal end of the scanner assembly positioned to correspond to the positive direction of the Z axis of a polar coordinate system and with the scanner assembly longitudinal axis aligned with the Z axis of the polar coordinate system, upon rotation of the turret through all values of phi in the polar coordinate system from and including 0 degrees to and including 360 degrees, the scanner assembly possesses a field of view that is symmetric with respect to the Z axis and exceeds a hemisphere.

A scanner manipulator comprising a scanner assembly according to any one or more of the descriptions above may be configured so that the scanner manipulator further comprises an extended form or scanner manipulator arm having a distal end and a proximal end, and a longitudinal axis collinear with the longitudinal axis of the scanner assembly and extending from the distal end to the proximal end; wherein the distal end of the scanner manipulator is fixedly attached to the proximal end of the scanner assembly; and wherein the extended form or scanner manipulator arm extends longitudinally from the scanner assembly.

The disclosed exemplary embodiments provide apparatuses, methods, and systems for autonomously characterizing the refractory lining of a metallurgical vessel as well the other uses hereinabove summarized and appreciated by those of ordinary skill in the applicable arts. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention.

However, one skilled in the art would understand that various embodiments might be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

ELEMENTS

2. Vessel
3. Vessel longitudinal axis
4. Shell
6. Layer of refractory material
7. Original layer of refractory material
8. Opening
10. Scanner assembly
12. Distal end of scanner assembly
14. Proximal end of scanner assembly
16. Scanner assembly longitudinal axis
20. Mounting arm
22. Proximal end of mounting arm
24. Distal end of mounting arm
26. Heat shield
28. Proximal end of heat shield
30. Distal end of heat shield
32. Turret
34. Proximal end of turret
36. Distal end of turret
40. Emitter/sensor
42. Emitter/sensor field of view
44. Emitter/sensor field of view distal limit
46. Emitter/sensor field of view proximal limit.
48. Line extending from the emitter/sensor in a plane orthogonal to the longitudinal axis
50. Acute angle between proximal limit of emitter/sensor field of view and line extending from the emitter/sensor in a plane orthogonal to the longitudinal axis.
52. Acute angle between distal limit of emitter/sensor field of view and scanner assembly longitudinal axis
54. Acute angle between proximal limit of emitter/sensor field of view and scanner assembly longitudinal axis
62. Emitter/sensor window
80. Scanner manipulator
82. Manipulator arm
84. Manipulator arm longitudinal axis (optical centerline of scanner)
86. Distal field of view constituent angle
88. Proximal field of view constituent angle
100. Scanner system
110. Support base
112. Support arm
114. Support base platform
116. Support arm actuator
118. Support base platform actuator
130. Positioning sensor
134. Manipulator actuator
140. Control device
142. Data input port
144. Control output port
152. Human/system interface
154. Data storage
170. Processor
200. Spherical coordinate system
202. Angle theta (θ)
204. Angle phi (φ)
206. Radial distance r
302. Extent of insertion of emitter/sensor into vessel
304. Distance of emitter/sensor from horizontal inner face of wall at opening
400. Mechanical portion of scanner system
405. Surface
410. Support base channel
412. Actuator
414. Direction of travel
420. Rotatable connection
422. Actuator
424. Direction of rotation
426. Support arm channel
428. Direction of travel
430. Actuator
432. Direction of rotation
434. Pivot
436. Actuator
438. Direction of rotation
440. Actuator
442. Direction of travel

What is claimed is:

1. A scanner assembly for measuring wear in a refractory lining, comprising: a first distal end, a first proximal end, and a longitudinal axis extending from the first proximal end to the first distal end;

a mounting arm having a second proximal end and a second distal end and located at the first distal end of the scanner assembly; a turret having a third proximal end and a third distal end, wherein the third proximal end of the turret is rotatably mounted on the second distal end of the mounting arm, in that the turret can rotate relative to the mounting arm about the longitudinal axis; and an emitter/sensor mounted in the turret; wherein the emitter/sensor comprises an optical center, wherein the emitter/sensor contains a laser, optics, a photodetector and receiver electronics;

wherein the optical center of the emitter/sensor is located on the longitudinal axis;

wherein a field of view of the emitter/sensor is contained in a plane also containing scanner assembly longitudinal axis; wherein the field of view comprises a distal limit extending from the third distal end of the turret, and comprises a proximal limit disposed opposite to the distal limit;

wherein the field of view of the emitter/sensor is described, in a longitudinal direction, by an obtuse angle containing, in all rotation positions of the turret around scanner assembly longitudinal axis, the extension of the longitudinal axis from the first distal end of the scanner assembly, and containing a line extending from the emitter/sensor in a plane orthogonal to the longitudinal axis; and wherein the emitter/sensor is mounted in a fixed position in the turret, the emitter/sensor being configured to fire rapid pulses of laser light at a target surface and being configured to measure the amount of time it takes for each pulse to return from the target surface to the scanner assembly through the field of view.

2. The scanner assembly according to claim 1, wherein a rotatable joining of the second distal end of the mounting arm to the third proximal end of the turret enables the turret to rotate 360 degrees around the longitudinal axis of the scanner assembly.

3. The scanner assembly according to claim 1, wherein a heat shield is disposed over at least a portion of a circumference of the second distal end of the mounting arm.

4. The scanner assembly according to claim 1, wherein the scanner assembly contains exactly one emitter-sensor.

5. The scanner assembly according to claim 1, wherein the scanner assembly is not in communication with a refractory application device.

6. The scanner assembly according to claim 1, wherein the turret is constrained from rotating about the mounting arm any axis other than the longitudinal axis of the scanner assembly.

7. The scanner assembly according to claim 1, wherein, with the first distal end of the scanner assembly positioned to correspond to a positive direction of a Z axis of a polar coordinate system and with the scanner assembly longitudinal axis aligned with the Z axis of the polar coordinate system, upon rotation of the turret through all values of phi in the polar coordinate system from and including 0 degrees to and including 360 degrees, the scanner assembly possesses a field of view including at all values of phi, all values of theta in the polar coordinate system from and including 0 degrees to and including 91 degrees.

8. The scanner assembly according to claim 1, wherein, with the first distal end of the scanner assembly positioned to correspond to a positive direction of a Z axis of a polar coordinate system and with the scanner assembly longitudinal axis aligned with the Z axis of the polar coordinate system, upon rotation of the turret through all values of phi in the polar coordinate system from and including 0 degrees to and including 360 degrees, the scanner assembly possesses a field of view that is symmetric with respect to the Z axis and exceeds a hemisphere.

9. A scanner manipulator, comprising the scanner assembly according to claim 1, wherein the scanner manipulator further comprises a manipulator arm having a distal end and a proximal end, and a manipulator arm longitudinal axis collinear with the longitudinal axis of the scanner assembly and extending from the distal end to the proximal end; wherein the distal end of the scanner manipulator is fixedly attached to the proximal end of the scanner assembly; and wherein the manipulator arm extends longitudinally from the scanner assembly.

10. A scanner system for measuring wear in a refractory lining, comprising:
the scanner manipulator according to claim 9;
a support arm having a proximal end and a distal end;
a support base;
a system control device;
at least one vessel positioning sensor in data transmission communication with the system control device;
a manipulator actuator in communication with the scanner manipulator, wherein the system control device is in commanding communication with the manipulator actuator, and wherein the manipulator actuator is in data transmission communication with the system control device;
a support arm actuator in communication with the support arm, wherein the system control device is in controlling communication with the support arm actuator; and a processor; in data communication with the at least one vessel positioning sensor, the manipulator actuator, the support arm actuator, and the emitter/sensor; wherein the distal end of the support arm is connected to the proximal end of the scanner manipulator; and
wherein the proximal end of the support arm is connected to the support base.

11. The scanner system according to claim 10, wherein the proximal end of the scanner manipulator is hingedly connected to the distal end of the support arm.

12. The scanner system according to claim 10, wherein the proximal end of the support arm is movably connected to the support base.

13. The scanner system according to claim 10, wherein the distal end of the support arm is fixedly connected to the proximal end of the scanner manipulator.

14. Method of measuring wear in a refractory lining, comprising:
emptying a vessel containing the refractory lining;
positioning the vessel;
orienting the vessel so that a surface of interest of the refractory lining positioned inside the vessel can be contained in a field of view of a scanner assembly;
providing a scanner assembly comprising a mounting arm; a turret attached to the mounting arm in a rotatable manner, and an emitter/sensor contained within the turret, wherein the emitter/sensor contains a laser, optics, a photodetector and receiver electronics, wherein the emitter/sensor is mounted in a fixed position in the turret, the emitter/sensor being configured to fire rapid pulses of laser light at a target surface and being configured to measure the amount of time it takes for each pulse to return from the target surface to the scanner assembly through the field of view;
wherein the scanner assembly possesses, with a distal end of the scanner assembly positioned to correspond to a positive direction of a Z axis of a polar coordinate system and with a longitudinal axis of the scanner assembly aligned with the Z axis of the polar coordinate system, on rotation of the turret through all values of phi in the polar coordinate system from and including 0 degrees to and including 360 degrees, a field of view that is symmetric with respect to the Z axis and exceeds a hemisphere;
placing the scanner assembly at a measurement position;
activating the emitter/sensor;

rotating the turret through all values of phi in the polar coordinate system;

obtaining, for selected values of phi, data for selected values of theta in the polar coordinate system;

collecting the data provided by the emitter/sensor in a single scan; and generating a profile of an interior of the vessel from the collected data provided by the emitter/sensor.

\* \* \* \* \*